(12) United States Patent
Vermeirsch

(10) Patent No.: US 9,436,074 B2
(45) Date of Patent: Sep. 6, 2016

(54) PROJECTION SYSTEM AND METHOD OF PROJECTING MULTIPLE IMAGES

(75) Inventor: Koenraad Vermeirsch, Bellegem (BE)

(73) Assignee: Barco NV, Kortrijk (BE)

( * ) Notice: Subject to any disclaimer, the term of this patent is extended or adjusted under 35 U.S.C. 154(b) by 72 days.

(21) Appl. No.: 14/372,084

(22) PCT Filed: Jan. 15, 2012

(86) PCT No.: PCT/EP2012/050535
§ 371 (c)(1),
(2), (4) Date: Jul. 14, 2014

(87) PCT Pub. No.: WO2013/104430
PCT Pub. Date: Jul. 18, 2013

(65) Prior Publication Data
US 2014/0354957 A1    Dec. 4, 2014

(51) Int. Cl.
| G03B 21/13 | (2006.01) |
| G03B 21/26 | (2006.01) |
| G03B 11/00 | (2006.01) |
| G03B 37/04 | (2006.01) |
| B05D 3/00 | (2006.01) |
| G02B 5/20 | (2006.01) |

(52) U.S. Cl.
CPC ............... *G03B 21/26* (2013.01); *B05D 3/007* (2013.01); *G02B 5/205* (2013.01); *G03B 11/00* (2013.01); *G03B 21/13* (2013.01); *G03B 37/04* (2013.01)

(58) Field of Classification Search
CPC .... G03B 21/13; G03B 21/26; C08L 2666/02
See application file for complete search history.

(56) References Cited

U.S. PATENT DOCUMENTS

| 3,948,171 A | * | 4/1976 | O'Connell | B41F 17/22 101/211 |
| 5,077,154 A | | 12/1991 | Corley | |
| 6,183,071 B1 | | 2/2001 | Sugimoto et al. | |
| 2003/0156262 A1 | * | 8/2003 | Baker | H04N 9/3147 353/31 |
| 2003/0174196 A1 | | 9/2003 | Yashima et al. | |
| 2004/0240068 A1 | | 12/2004 | Namazue et al. | |
| 2005/0287449 A1 | | 12/2005 | Matthys et al. | |
| 2009/0279168 A1 | * | 11/2009 | Hiwatashi | C09J 11/06 359/359 |
| 2010/0195029 A1 | * | 8/2010 | Maeda | G02F 1/133514 349/106 |
| 2011/0096388 A1 | * | 4/2011 | Agrawal | G02F 1/1506 359/268 |
| 2012/0314971 A1 | * | 12/2012 | Yuan | G06T 5/008 382/274 |

OTHER PUBLICATIONS

International Search Report and Written Opinion dated Oct. 29, 2012 for Corresponding Application No. PCT/EP2012/050535.

* cited by examiner

*Primary Examiner* — Sultan Chowdhury
(74) *Attorney, Agent, or Firm* — Renner, Otto, Boiselle and Sklar LLP

(57) ABSTRACT

The present invention relates in part to a print method for an arbitrary grey scale image on a transparent substrate such as glass. The present invention makes use of a printer that can print in continuous grey tones. The printed material should be transparent and resistant to the light which passes through it in a projection system. The present invention also provides a continuous grey scale filter made by a printing techniques using liquid inks or toners. Such a continuous grey scale filter can be used for blending multiple images in a multi-channel projector system. The present invention also provides a multichannel projector system using the continuous grey scale filter.

22 Claims, 9 Drawing Sheets

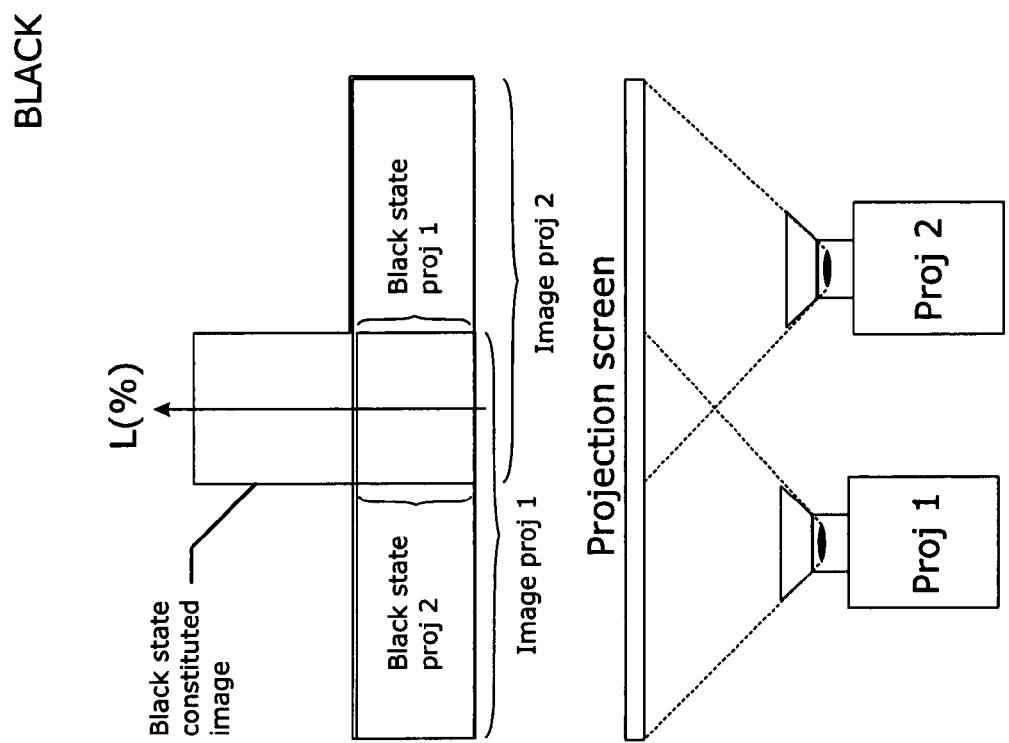
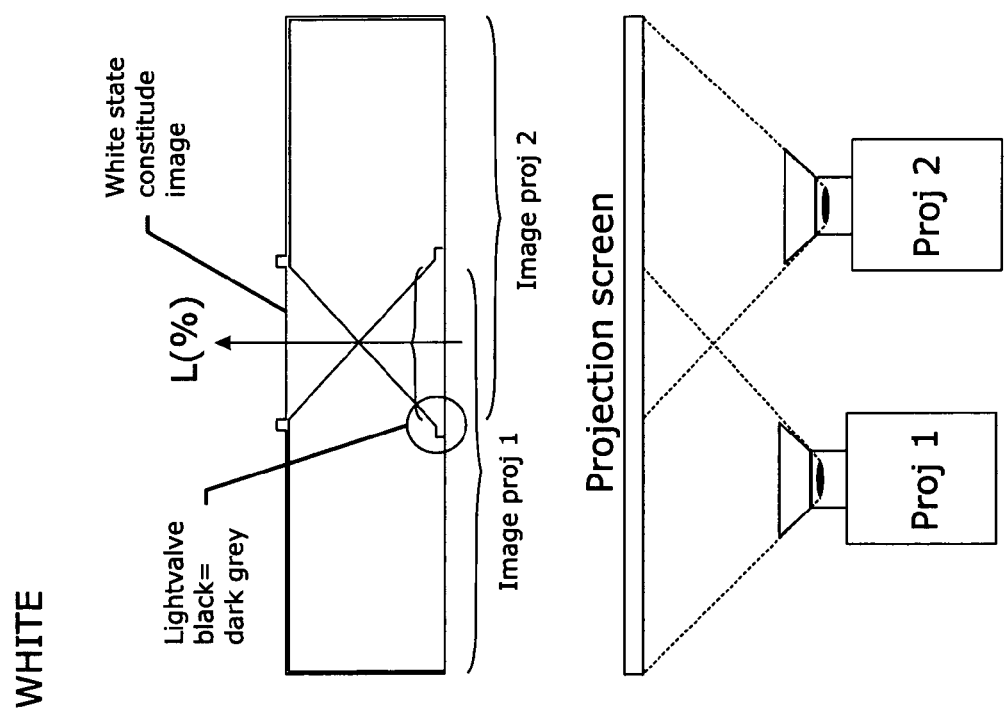
Fig. 4

PROJECTION SYSTEM AND METHOD OF PROJECTING MULTIPLE IMAGES

This application is a national phase of International Application No. PCT/EP2012/050535 filed Jan. 15, 2012 and published in the English language.

TECHNICAL FIELD OF THE INVENTION

The present invention relates to a projection system and a method of projecting multiple images as well as to a continuous tone filter for use in a multichannel projection system.

BACKGROUND OF THE INVENTION

A drawback with light valve projectors is that a certain amount of light leaks through in the black state i.e. a full black image is not black, but very dark grey representing a limitation in the contrast ratio. This is particularly problematic in display systems that make use of at least two projectors to constitute an image. An example is given in FIG. 1. In FIG. 1 the left hand projector proj 1 is shown back projecting a first image onto half of a display screen. The second half of the image is projected by a right hand projector.

A first approach is to stitch two images to one single image but due to projector misalignments and projection lens errors this will always result in a disturbing dark or bright seam in the image, shown schematically FIG. 2—front view showing black or discoloured region between the two images. In FIG. 2 a first projector (proj 1) projects half of the image onto a projection screen and a second projector (proj 2) projects the other half. An attempt is made to align the two images exactly so there is no overlap and no gap. An alternative approach is to arrange the projectors such that their images will partially overlap. However, without corrective actions this will lead to zones in the image where the brightness basically is double, see FIG. 3. One could consider reducing the brightness in the overlap zone e.g. electronic compensation is one method to try and correct such problems. However, for dark images this adjustment is not possible, since the pixels are already at their minimum value all over the image. Therefore in the overlap region of dark images the brightness will be double (FIG. 4). This double black artefact is inherent to electronic blending and the only way to obtain a uniform black state is by increasing the black level outside the overlap region. However doubling the brightness of a dark state implies halving the contrast ratio of the image.

Another approach is to use a kind of binary mask somewhere near an image plane, for instance between projection lens and image (FIG. 5). FIG. 5 shows one of a plurality of projectors with the image projected through a binary optical mask. The mask either passes or blocks the light. A simple metallic plate can be used for this. The transition zone between bright image and dark image is determined by the size, position and filling of the lens aperture and the position of the hard filter with respect to this lens aperture. This brightness transition is typically non linear and there is only limited adjustment possibilities to control the shape and width of the blended area. Therefore this technique will require almost always an electronic clean up method to reduce the brightness artefacts. Nevertheless in some simple display configurations it may lead to acceptable results. For more challenging display systems such as a flight simulator, where curved screens and a multiple of projectors are used, this technique can hardly result in a high quality image.

A still further approach is to use an optical filter with multiple grey scales (FIG. 6). In this case optical blend filters are used between each projector proj 1 and 2 which have a range of grey scales. A problem with this is that grey scales are achieved by dither patterns if they are printed. The denser the dither pattern, the darker the grey level (FIG. 7). These dither patterns consist of dots—the more dots the darker the image. Inserting an optical filter with a dither pattern in the light path between light valve of a projector and image gives rise to unacceptable artifacts such as diffraction or visibility of the dither pattern in the image. The higher the dither pattern resolution, the higher the diffraction becomes. Diffraction can then in turn be minimized using a randomized dither pattern. However a randomized pattern will spread the incoming light over all possible diffraction orders, i.e. it will scatter light in all directions which results in a poor image ANSI contrast. Besides this the sharpness, i.e. the modulation depth (or modulation transfer function, MTF) of the image will get worse.

U.S. Pat. No. 5,077,154 discloses a soft edge mask for use in the projection of a photographic image on to a viewing screen and comprising: a panel; a continuous mask portion formed by a substantially opaque area of said panel and defined by a clearly focussed edge of a first size and having a predetermined rectangular, triangular, square or star shape; a continuous clear portion formed by a substantially transparent portion of said panel and defined by a clearly focussed edge of the same said predetermined shape but having a second size different from said first size; and a margin portion extending between said mask portion and said clear portion, said margin portion having a light transmissability progressively decreasing from said transparent portion to said mask portion and, at all positions between said transparent portion and said mask portion, being clearly focussed and having a shape the same as said predetermined shape but being proportionately sized relative to said first and second sizes and intermediate said first and second sizes, whereby, when said soft edge mask is used in projecting a photographic image, a first portion of such a photographic image is projected on to such a screen, a second portion of such an image is masked from such a screen, and a marginal portion of such an image between said first and second portions is progressively faded without significant loss of resolution and without significant distortion of said predetermined shape. U.S. Pat No. 5,077,154 further discloses that the margin portion preferably comprises a plurality of strips, each being defined by edges of the same said predetermined shape and said strips being of progressively varying light transmissabilities and that these masks may be used in front of a first (slide) projector so as to permit a second (slide) projector to blend its image into the first one.

Conventional methods can be very tedious and labour-intensive for making soft edge masks. A first technique to apply these inks is by screen printing. The inks are not liquid inks but are pastes. Two important drawbacks are that every grey level requires another screen print mask (FIG. 10) and it is difficult to control the layer thickness of the inks. Equation (1) below shows that thickness variations will give rise to transmission variations:

$$I = I_0 \cdot \exp(-k \cdot d)$$

in which $I_0$ is the light intensity at the entrance of the layer (after surface reflection), I is the light intensity at the exit of the layer (before surface reflection), k is the absorption constant and d is the thickness of the layer. The absorption constant k depends on the ink that is considered. A second technique is conventional black and white photography on glass plates using digital exposure techniques. Conventional photographic films are unsuitable due to the inability of the gelatine binder to withstand the high temperatures and high light intensities without degradation.

There are generally two important drawbacks of known printing techniques, namely the are the limited maximum optical density of the current dyes and the limited resistance of the current dyes to the high light intensities involved. In addition it is not straightforward to print directly on glass.

SUMMARY OF THE INVENTION

An object of the present invention is to provide an alternative projection system and a method of projecting multiple images as well as a continuous tone filter for use in a multichannel projection system.

The present invention relates in part to a print method for an arbitrary grey scale image on a transparent substrate such as glass that eliminates at least one disadvantage of screen printing such as not requiring different masks. The present invention makes use of a printer that can print in continuous grey tones. The printed material should be transparent and resistant to the light which passes through it in a projection system. One such printer is a dye sublimation printer in which dyes on a carrier are sublimated and migrate onto a substrate (FIG. 8). However such a printer and print method when used in accordance with the present invention is used with inks that are light resistant suitable for use in a projector. Also the printer and print method should be adapted to print on glass or other transparent substrates. Another such printer is an electrostatic printer with liquid toner. A preferred printer is an inkjet printer and an inkjet printing method which has at least one of the advantages that it is relatively cheap, is suited to print on glass and ink jet inks are available that are light resistant, and can be less labour intensive. Embodiments of the present invention include digital printing techniques that are modified for continuous tone printing on glass.

In particular embodiments of the present invention avoid digital printing techniques that use dithering. For printers and printing methods with liquid inks or toners (e.g. inkjet or electrostatic) an option is blurring of the printed image so that a continuous grey scale results.

The present invention also provides a continuous grey scale filter made by a printing techniques using liquid inks or toners as described above. Such a continuous grey scale filter can be used for blending multiple images in a multichannel projector system. The continuous tone of the filter may vary from zero to an optical density of at least 1.5 or 2.0 or grater than 3 on a transparent support.

Two or more inks (for instance up to 12) with different optical density can be used to make images with continuous tones. The liquid toners or inks may include particles that have a neutral colour. Such particles may include carbon black with some (metallic) blue particles to regain this colour neutrality. Embodiments of the present invention include mixing with transparent ink and/or liquid toner to combine two (or possibly more) inks with different optical density. More than one layer can be deposited on one substrate. After drying it can be necessary to deposit a new layer with a similar technique to achieve the required grey scale, e.g. just in case the mixing with the transparent ink does not work well.

It has been surprisingly found that replacing grey scales achieved by dither patterns with an optical filter with continuous tones (i.e. with analogue or true grey scales), a projector system without the poor image ANSI contrast and with improved image sharpness is realised. it has been found that in view of the high light intensities involved and the resulting high temperatures attained by the filter and the requirement that the continuous filter having a constant thickness so as to provide a non-distorted image an optical filter with continuous tones (i.e. with analogue or true grey scale) with the necessary thermal and light resistance for an acceptable lifetime, e.g. at least 1000 hours and preferably at least 10,000 hours, is difficult to realise using conventional techniques.

It has been found that with a combination of coloured and colourless inks or liquid toners it is possible to provide a continuous tone filter with constant thickness and thermal and light resistance. The continuous tones are achieved by a number of temperature- and light-resistant transparent inks or toners, i.e. they do not scatter the incoming light, but should absorb or reflect a certain amount of the light (FIG. 9) and are preferably colour neutral over a broad wavelength range i.e. above 400 nm or below 950 nm or in ranges such as from 400 nm to 950 nm or 400 nm-700 nm or 700-950 nm. Moreover, in order to realise the necessary homogeneity in grey tone it is preferred that the liquid inks are toners used, bleed one into the other with a resulting loss in resolution, which would be prohibitive for conventional high resolution printing. This is achieved by modifying the liquid inks or toners to ensure that one deposited droplet is not completely dry when overlaid with another so that the droplets can diffuse into one another. The proportion of transparent ink or toner to coloured ink or toner varies with optical density to maintain a constant layer thickness across the continuous tone filter.

It is an object of the present invention to realise a projection system with at least two projectors capable of providing a full-black image while seamlessly merging images.

It is a further object of the present invention to realise a continuous blend filter for use in a projection system with at least two projectors to realise this aim and a process for realising the continuous blend filter.

It is an advantage of the present invention to use liquid colourants, inks or toners, i.e. not thick paints or pastes nor dry toners to make continuous tone blend filters by a printing process. This manufacturing method is convenient, economical while obtaining performance of continuous tone blend filters in multichannel projection systems which is equivalent to performance of other known methods.

The above objective is accomplished by a method and device according to the present invention as claimed.

Particular and preferred aspects of the invention are set out in the accompanying independent and dependent claims. Features from the dependent claims may be combined with features of the independent claims and with features of other dependent claims as appropriate and not merely as explicitly set out in the claims.

Although there has been constant improvement, change and evolution of devices in this field, the present concepts are believed to represent substantial new and novel improvements, including departures from prior practices, resulting in the provision of more efficient, stable and reliable devices of this nature.

The above and other characteristics, features and advantages of the present invention will become apparent from the following detailed description, taken in conjunction with the accompanying drawings, which illustrate, by way of example, the principles of the invention. This description is

BRIEF DESCRIPTION OF THE DRAWINGS

FIG. 4 shows two projectors with overlapping images, left bright state, right dark state which can be used with embodiments of the present invention.

Figure 1:
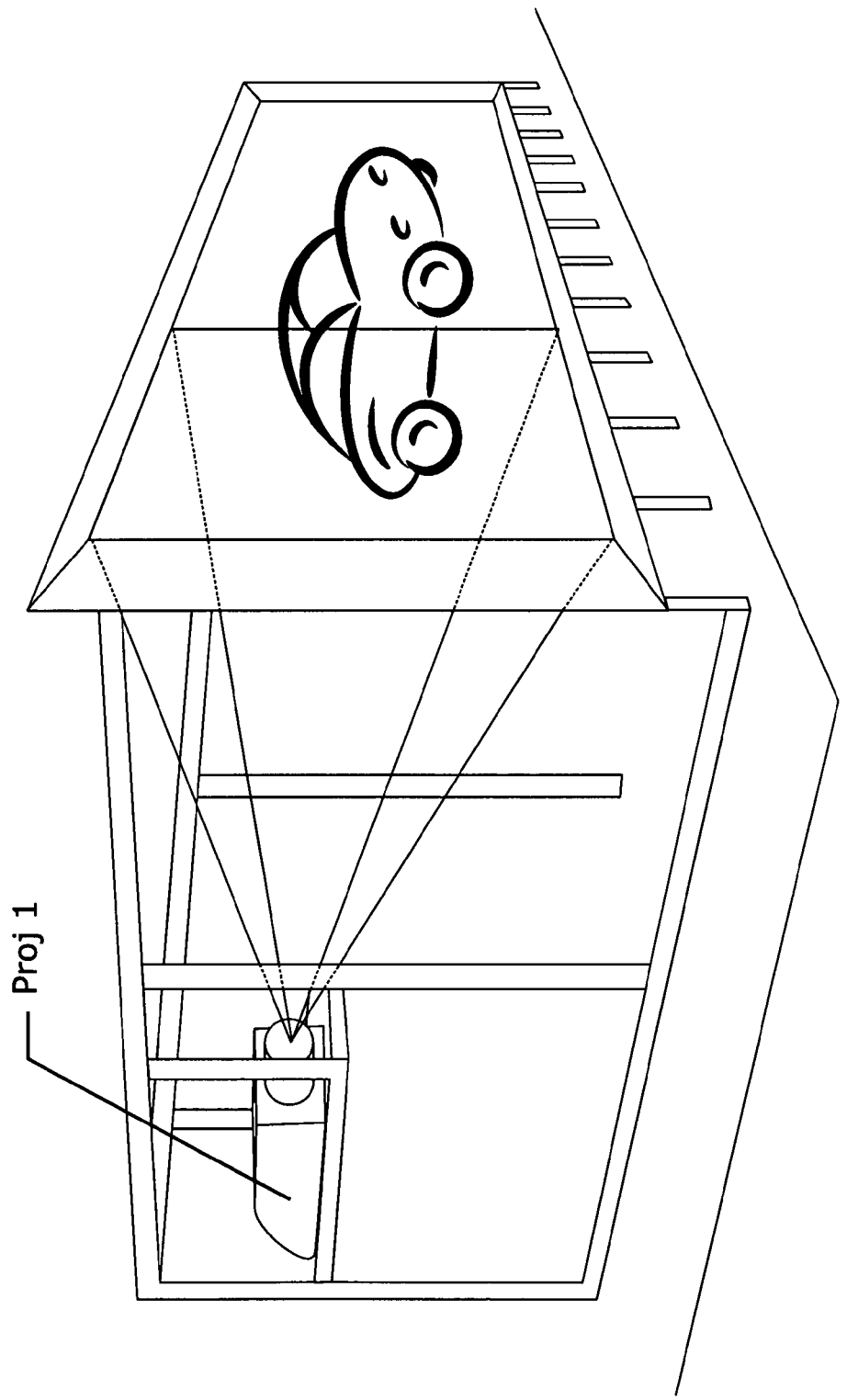
FIG. 1 shows an example of a multichannel display system which can be used with embodiments of the present invention.
Figure 2:
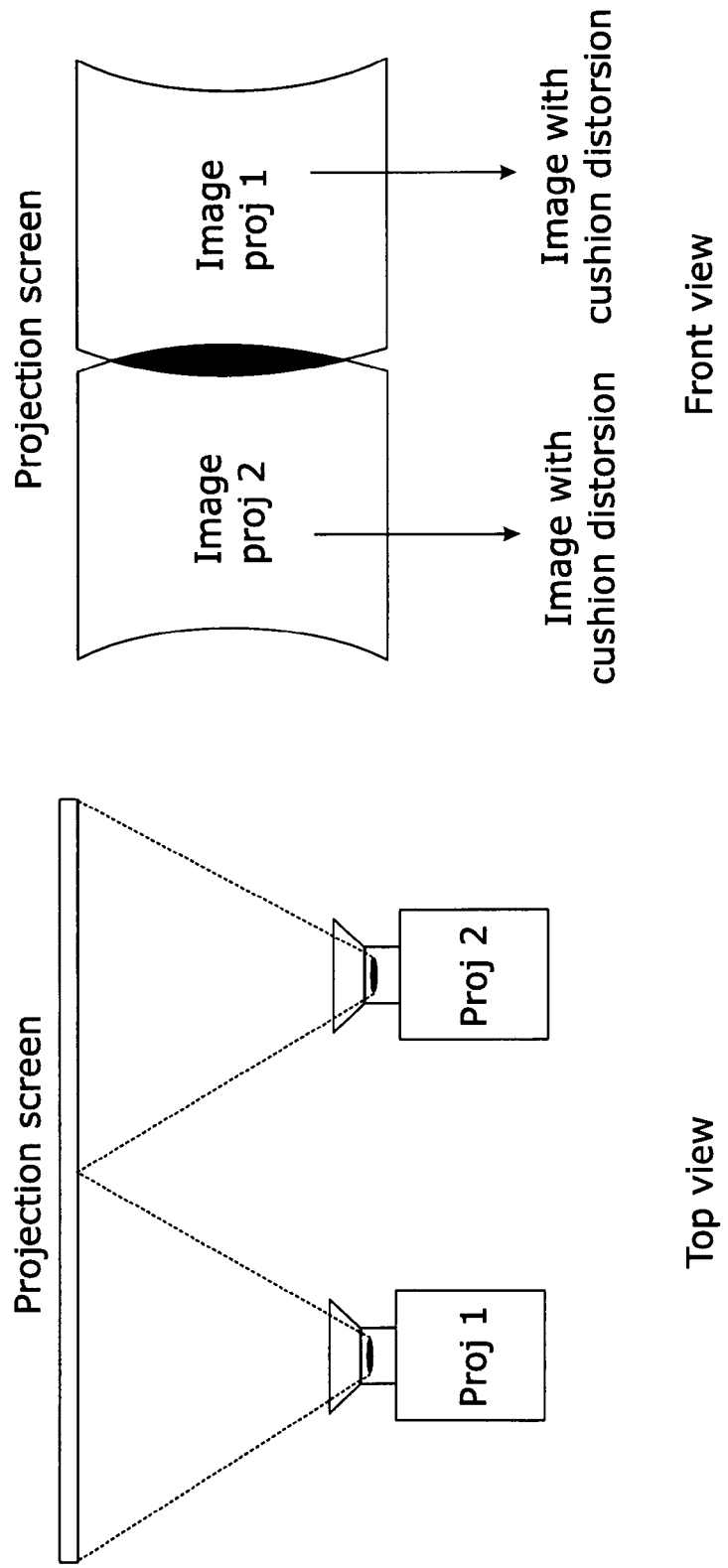
FIG. 2 shows an example of a stitched multichannel display system which can be usd with embodiments of the present invention.
Figure 6:
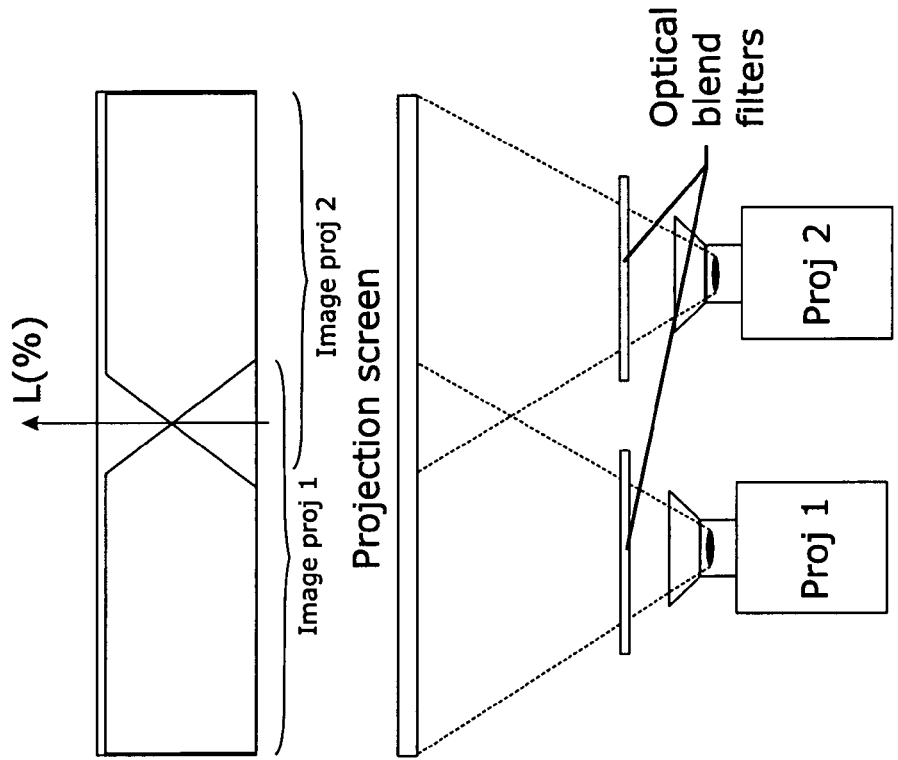
FIG. 6 shows external optical filter with multiple grey scales and its principle of operation which can be used with embodiments of the present invention.
Figure 3:
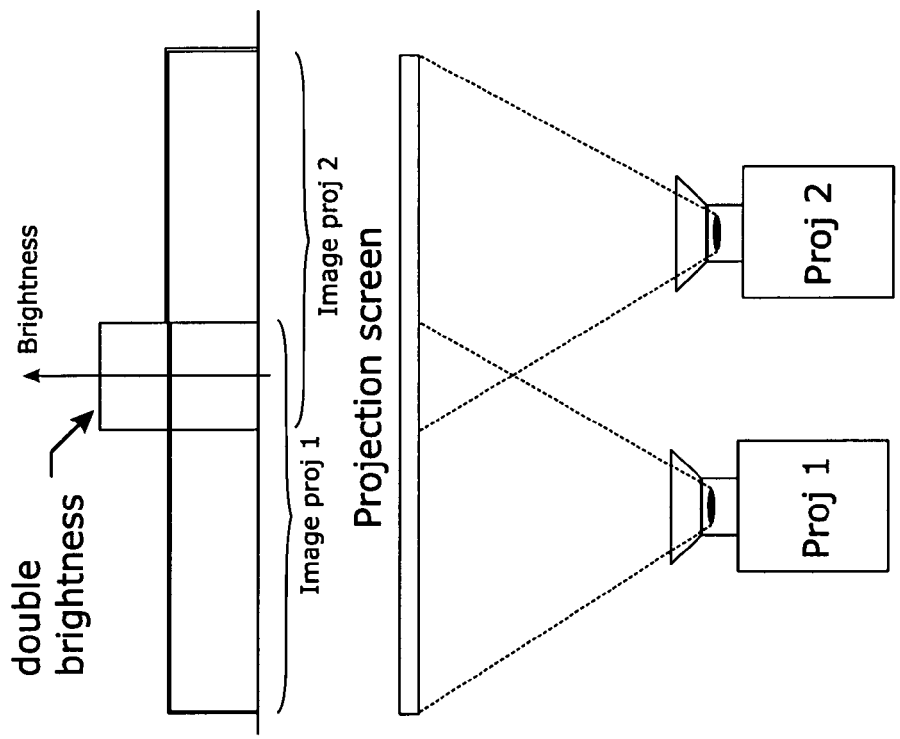
FIG. 3 shows projectors with overlapping images which can be used with embodiments of the present invention.
Figure 5:
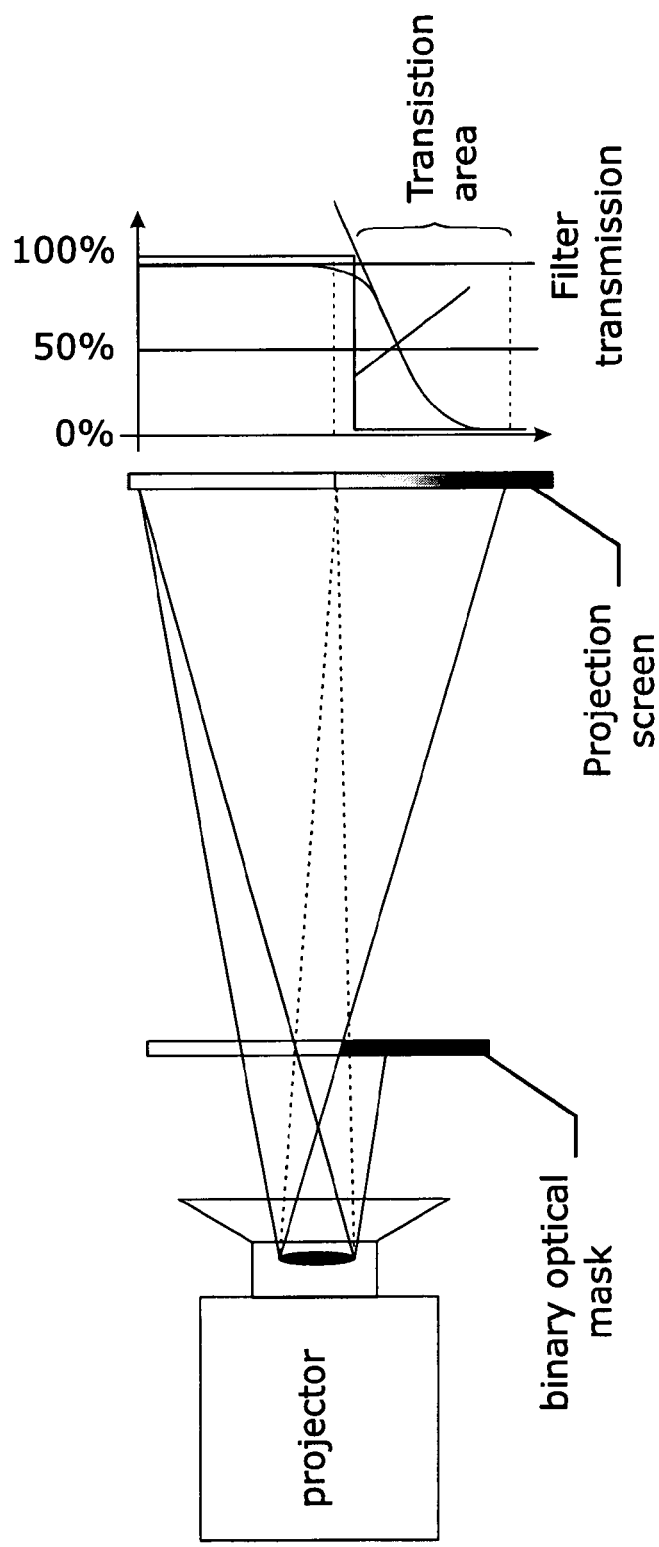
FIG. 5 shows an external binary optical mask and its principle of operation which can be used with embodiments of the present invention.
Figure 7:
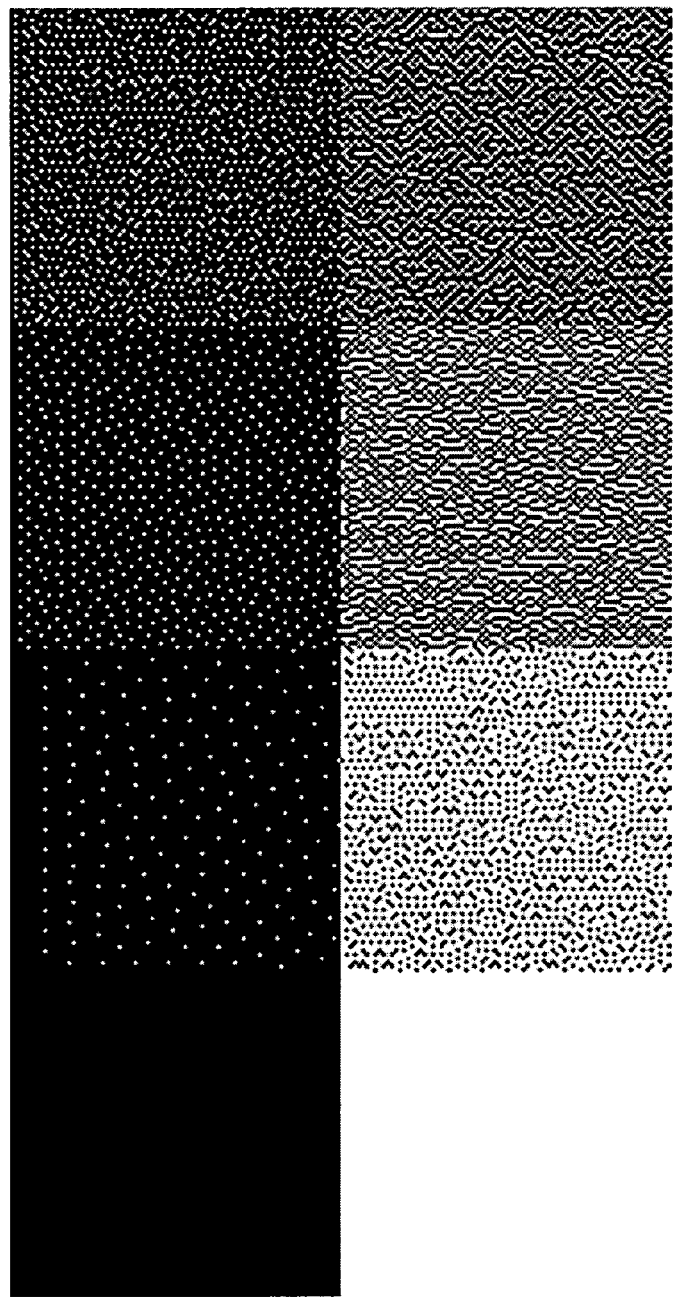
FIG. 7 shows dither patterns to achieve a certain grey level which are preferably not used in embodiments of the present invention.

In the different figures, the same reference signs refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

The following terms are provided solely to aid in the understanding of the invention.

Definitions

The term optical density: or absorbance, as used in disclosing the present invention, means the transmittance of an optical medium for a given wavelength. The higher the OD, the lower the transmittance OD=log 10(1/T), where T is the relative filter transmission.

The term "continuous tone", as used in disclosing the present invention, refers to prints that are made of continuous smooth transitions of tone and colour, rather than being composed of individual dots (see "Photo Finish: the digital photographer's guide to printing, showing, and Selling Images", Sybex, by J. Canfield, Tim Grey). Continuous tone is fundamentally different from contone (used in laser printers) and halftone (used in inkjet printers) which use dithering to achieve a grey tone.

The term transparent inks or toners, as used in disclosing the present invention, means inks or toners used in printing that allows the colour of other inks or toners layered under it to show-through. Transparent ink or toner is used in four-colour process printing that reproduces all the colours of the original image by printing two or three primary colours in layers. Transparent inks or toners are fundamentally different from opaque inks or toners, which are also called non-transparent inks or toners.

The term "overlapping droplets", as used in disclosing the present invention, means that a finite portion of one droplet is in contact with a finite portion of another droplet.

The term "multiple passes", as used in disclosing the present invention, means at least two passes over the same portion of substrate.

The term "dye", as used in disclosing the present invention, means a coloured substance, which are completely soluble in the carrier medium.

The term "pigment", as used in disclosing the present invention, means small, insoluble particles of a coloured substance. Pigment particles above a certain size scatter light resulting in non-transparent components, but below a certain particles size. e.g. nanoparticles, completely transparent components are obtained.

The term 'electrostatographic printing", as used in disclosing the present invention, includes electrophotographic printing and electrographic printing preferably with liquid toners (i.e. electrophoretic printing).

The term "bleeding", as used in disclosing the present invention, means the mixing of two ink or toner dots in two adjacent printed dots before they dry. This leads to reduced resolution and hence poorer print quality but provides a continuous tone variation.

The term "dot gain", as used in disclosing the present invention, means the increase in the diameter of a halftone dot during the prepress and printing processes.

The term light valve, as used in disclosing the present invention, means a device whose light transmission can be made to vary in accordance with an externally applied electrical quantity such as a voltage, current or electrical field; a magnetic field or an electron beam.

U.S. Pat. No. 6,183,071 is incorporated herein by reference an. It discloses an ink jet recording apparatus which can be used with the present invention taking into account the comments in the main description below which may require modification. The apparatus performs recording by means of a plurality of recording heads, each said recording head having at least one discharge opening, comprising: an ink storage means for storing an ink, wherein said ink contains a dye. A clear ink storage means may also be used for storing a clear ink, wherein the clear ink does not contain a dye. Mixing ratio setting means are also provided for setting the ratio of said ink and said, clear ink to be supplied to said recording head. Ink supplying means are provided for supplying the ink stored in said ink storage means to a first recording head in said plurality of recording heads, and supplying the ink stored in said ink storage means and said clear ink stored in said clear ink storage means to a second recording head in said plurality of recording heads at the ratio which is based on the set mixing ratio.

Premixing of a clear ink with a coloured ink as disclosed in U.S. Pat. No. 6,183,071 uses the mixing means to fulfil all optical densities between zero and at least 2.0, with at least 3.0 being preferred, without changing the ink deposition characteristics so as to ensure a constant deposition layer thickness.

Detailed description

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

It is to be understood that although preferred embodiments, specific constructions and configurations, as well as materials, have been discussed herein for devices according to the present invention, various changes or modifications in form and detail may be made without departing from the scope and spirit of this invention. Steps may be added or deleted to methods described within the scope of the present invention.

The present invention relates to a multichannel projection system or a method of projecting multiple images as well as to continuous tone blend filters. To the light in an overlap zone of the two adjacent projected images a continuous tone blend filter can be used. Besides this, it is also possible to combine the prior art blending techniques control described above with those of the present invention. For instance, if the optical density of the darkest state is insufficient, it is possible to use a mechanical shielding to eliminate the light leakage. Also it is possible to perform an electronic fine tuning to improve the quality of the overlap region in addition to the continuous tone blend filters of the invention.

In accordance with embodiments of the present invention, continuous tone blend filters with a constant thickness with continuous tone grey scales can be fabricated by a number of printing processes. The present invention will be described mainly with reference to ink jet printing but other printing methods using liquid toners or inks are included within the scope of the present invention.

Figure 8:
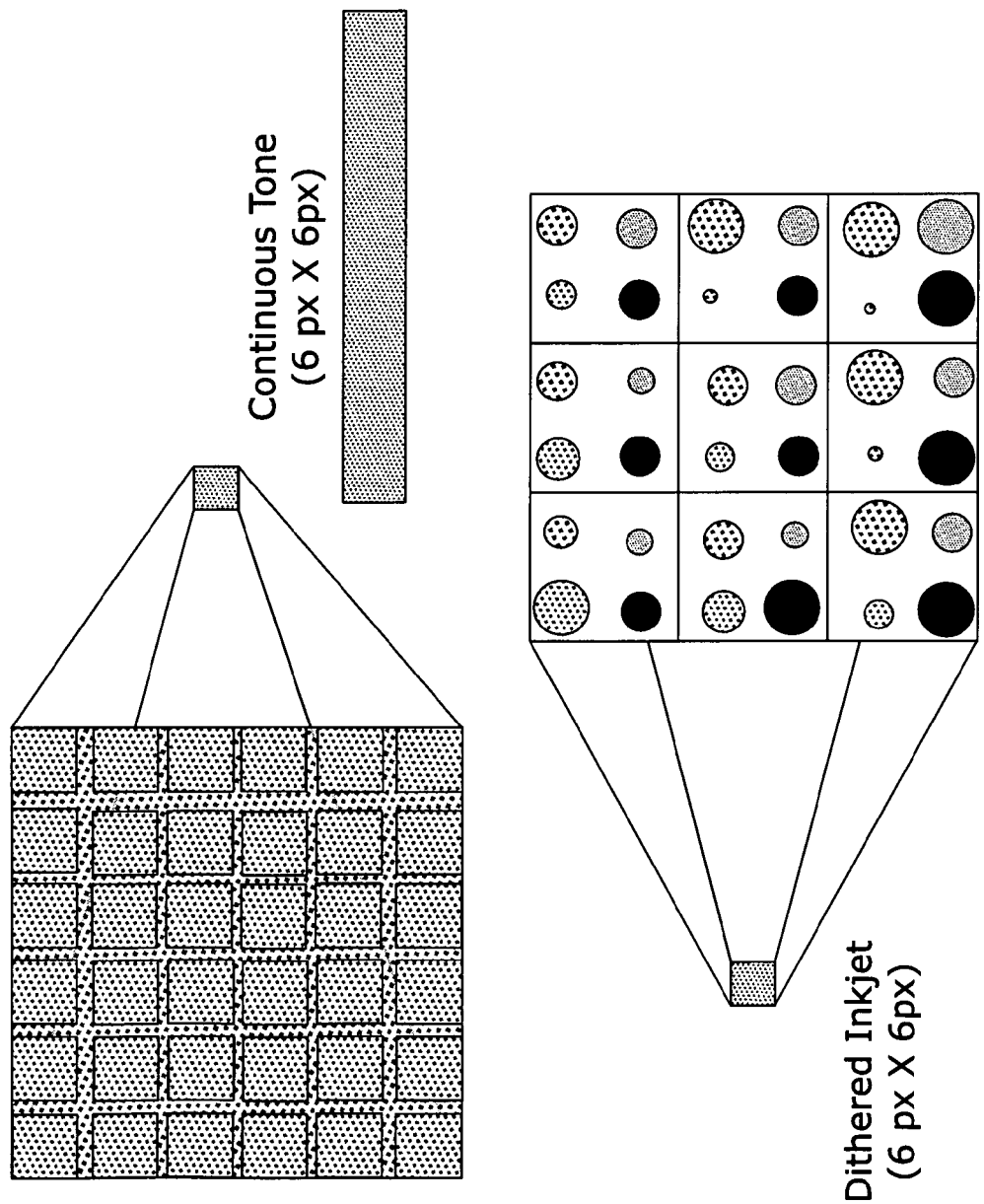
FIG. 8 shows dithered inkjet vs. continuous tone printing in accordance with embodiments of the present invention.
Figure 10:
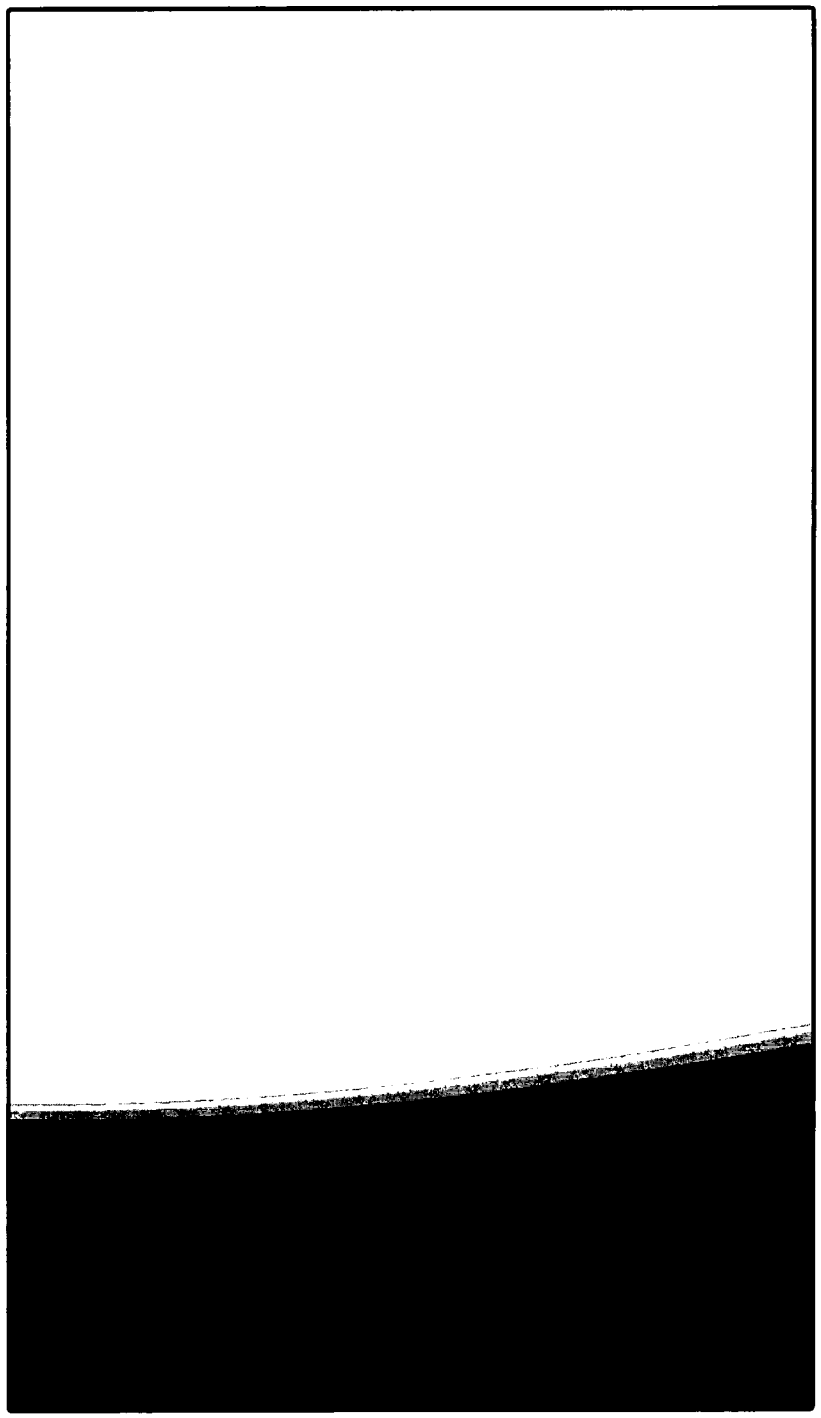
FIG. 10 shows an embodiment of the present invention being a lay out of continuous tone gray scale filter with 11 grey levels made using 11 liquid colourants such as inks.

In embodiments of the present invention liquid colourants, inks or toners are used, i.e. not thick paints or pastes nor dry toners. A first embodiment of the present invention requires inkjet printing on a transparent substrate such as glass. The printing process is adjusted in a way that every single pixel on the printed filter gets fully covered by ink or is not covered at all by ink. An aspect of the present invention is shown schematically in FIGS. 8 and 10. As shown in FIG. 8 if a dither pattern is used then dots of a colourant or ink are applied to a substrate. The more dots that are applied per unit square the darker the tint. In accordance with embodiments of the present invention continuous tones are obtained as shown schematically in the top image of FIG. 8. Differing greyscale values can be achieved and these combined into a graded toning on a transparent substrate such as glass to obtain continuous tone blend filter. This is possible by controlling the properties of the liquid ink, such as the viscosity and the open time, which is the time before the inks dries after being deposited on the substrate. The continuous tone may vary from zero to an optical density of at least 1.5 or 2.0 or greater than 3 on a transparent support. Alternatively or additionally the printing process can be adapted such as for instance the raster image processing (RIP), so as to lay down droplets in a manner designed to promote merging of droplets. The inkjet print technology is very suited for such an application. For example, a calculated grey scale bitmap image can be sent to the printer and the optical filter is fabricated quickly. The substrate can be a transparent glass plate. The glass plate being printed may have other layers such as an anti-reflective AR coating on one or both sides to improve the maximum transmission.

The number of inks that are used depends on the fabrication method. In the first embodiment several transparent inks can be used, one for each grey level. For a filter with 11 grey levels (see FIG. 10), 11 inks are used. The continuous tone may vary from zero to an optical density of at least 1.5 or 2.0 or greater than 3 on a transparent support.

In a second embodiment one ink is developed which is close to (but not completely) clear. The glass plate is printed a number of times with different print images to build up the desired transmission (or optical density) in each pixel, e.g. by multiple passes of the print head. This fabrication method leads to a glass plate with an ink coating that varies in thickness over the surface. It may be necessary to laminate a second transparent substrate to it by means of index matched glue to compensate the thickness variations In a third embodiment a limited number of inks are developed which can be used simultaneously during the print process via a multicolour printer head. Each colour toner contains an ink with different optical density. Hence in one single print step several grey scales can be applied. Different combinations of the different inks result in different grey scales. Suppose there are n inks and k layers are to be deposited. The number of possible combinations is given by the formula $$N\_tot = \binom{k+n-1}{k} = \frac{(k+n-1)!}{k!(n-1)!}$$

For 8 inks and 2 layers 36 theoretical combinations exist. In reality some of the combinations are not useful, as for example all combinations with black result in the same black. Hence these combinations are counted double in the above formula. Also, when defining the 8 inks one should try to get a balanced distribution of all grey levels that result from all possible ink combinations over the grey level range dark to bright.

In a fourth, preferred embodiment only two inks are used, a black or substantially black ink and a clear or substantially ink. Different grey scales are achieved by controlling the ratio of black and clear ink that is deposited. The black and clear ink should mix before drying, such that a homogeneous pixel of a certain grey level results. To achieve this, the printer may be modified such that two droplets are deposited either simultaneously or substantially simultaneously i.e. within 500 ms and preferably within 100 ms and close to one another i.e. on the same spot of the glass substrate, overlapping or at least contiguous to one another. This should facilitate the mixing of the droplets before drying. In this technique the number of grey scales is determined by the bit depth of the printing process.

This is fundamentally different from the usual printing procedure where inks are not deposited on the same spot and where inks are only deposited in the neighbouring position when the ink droplet in the first position is dry. In usual printing applications the goal is to reduce bleeding as much as possible. In printing according to any of the embodiments of the present invention resolution is not of great importance, e.g. a resolution of 100 DPI is high enough. Usual inkjet printers typically target higher DPI ranges, 300-600 DPI. The modified printing procedure is adapted to encourage the bleeding effect since the goal is to eliminate or reduce the visibility of the dots under a microscope. Having distinct dots would lead to scattering, in particular when the normal dithering procedure would be used. The result of the modifications is that most or all dots will be linked to each other; hence a layer with homogeneous thickness will be deposited. The transmittance of the layer at a certain position is controlled by the mixture ratio of the clear and dark ink at that particular position. This is fundamentally different from usual digital printing methods where grey scale is achieved by making used of dithering.

The modifications can include mechanical and software changes. One mechanical change may be in the drying process. In regular printers the goal is to dry the deposited ink as soon as possible in order to reduce bleeding while a goal of embodiments of the present invention is to increase the bleeding. Disabling or reducing the drying (/heating) process may be required to encourage this, e.g. to increase the humidity or water pressure vapour in the air around the printer, avoiding heating of the substrate or cooling the substrate before printing. One software change may be in the raster image processor (RIP), which produces the raster image (or bitmap) that is sent to the printing device. In a normal printing procedure pixel 1 and k are printed at the same time, pixel 2, pixel k−1, pixel k+1 are printed at a different time. In a printing process according to any of the embodiments of the present invention neighbouring pixels are printed at very small time differences.

The techniques described in the different embodiments above can of course be combined.

In a preferred embodiment of the fourth embodiment the optical filters are fabricated using an inkjet printing apparatus with a recording head using two inks, a coloured ink and a colourless ink; the printing apparatus being designed to print on glass.

As described in this preferred embodiment our modified inkjet printer apparatus can be considered as a low resolution analogue (or continuous tone) grey scale printer.

The description above describes blend filters but this technique can also be used to fabricate all kinds of optical filters, for instance optical filters to improve the luminance uniformity of a direct view display. The resolution of the filters is imposed by the resolution of the inkjet printer. The maximum dimensions of the optical filters are imposed by the inkjet printer.

According to a preferred embodiment of the printing process according to the present invention, the curing of the deposited components is thermal curing.

According to a further preferred embodiment of the printing process according to the present invention, the coloured and colourless components are deposited such that they at least partially overlap with one another.

According to a further preferred embodiment of the printing process according to the present invention, the transparent substrate is substantially flat.

According to a further preferred embodiment of the printing process according to the present invention, the continuous tone varies from zero to an optical density of at least 3.0.

According to a further preferred embodiment of the printing process according to the present invention, the printing process is selected from the group consisting of electrostatographic printing with liquid toners, any liquid ink printing technique, e.g. jetting, spraying, diffusion transfer printing or ink-jet printing.

According to a further preferred embodiment of the printing process according to the present invention, the printing process is ink-jet printing and said at least one coloured component and said at least one colourless component are ink-jet droplets.

According to a further preferred embodiment of the printing process according to the present invention, the printing process is ink-jet printing and said at least one coloured component and said at least one colourless component are ink-jet droplets and the coloured and colourless ink-jet droplets are deposited simultaneously or substantially simultaneously.

According to a further preferred embodiment of the printing process according to the present invention, the printing process is ink-jet printing and said at least one coloured component and said at least one colourless component are ink-jet droplets and the coloured and colourless ink-jet droplets have an open time of at least 10s, with an open time of at least 100 s being preferred.

The at least one coloured component comprises a colourant, which can be a dye or a pigment, and may be applied in a solid or liquid form during deposition. If the coloured component is applied in a solid form, the coloured component will further comprise at least one binder. If the coloured component is applied as a liquid during deposition, e.g. as a solution or as a suspension, the coloured components will further comprise at least one liquid carrier. If the at least one liquid carrier completely evaporates after and during deposition, the coloured component will further comprise at least one binder. If at least one liquid carrier is a molten binder which hardens upon cooling or is subsequently hardened in a curing process, the coloured component may further comprise at least one binder. The curing process is preferably a thermal curing process and may also involve at least one of the binders, if present. The at least one coloured component is preferably applied as a liquid during deposition.

The at least one colourless component may be applied in a liquid form during deposition. When the colourless component is applied as a liquid, the colourless components will further comprise at least one binder, which hardens upon cooling, and/or at least one liquid which is subsequently hardened in a curing process. The curing process is preferably a thermal curing process and may also involve at least one of the binders, if present. The at least one colourless component is preferably deposited as a liquid.

Figure 9:
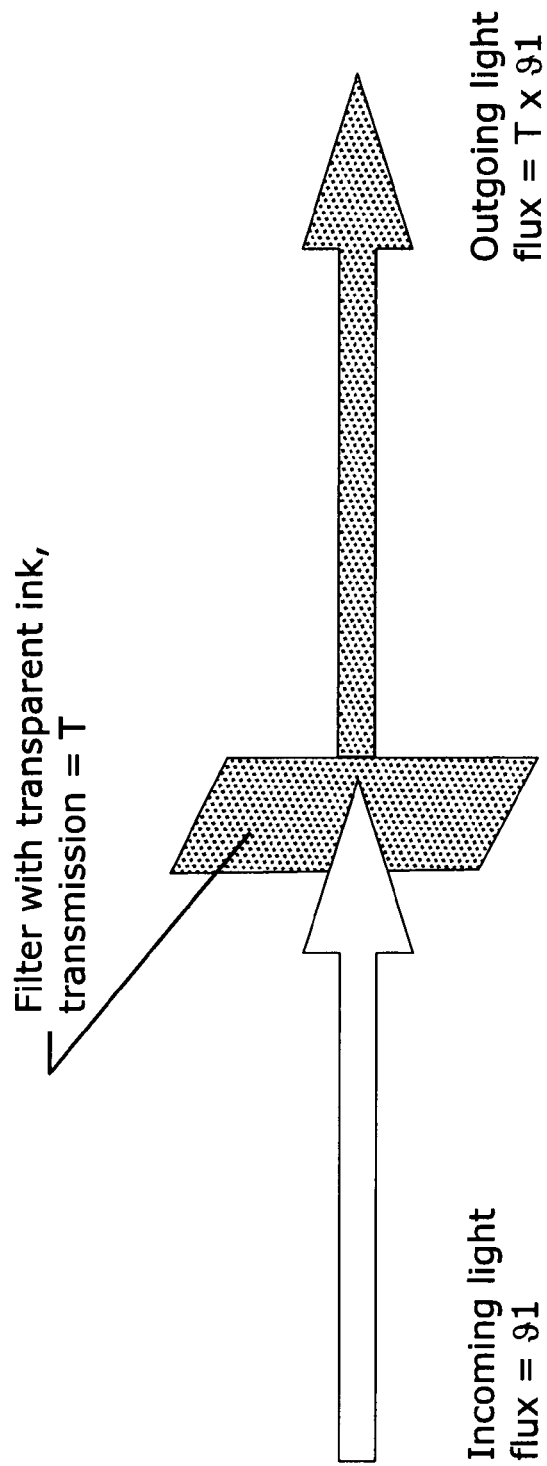
FIG. 9 shows a transmissive filter with transparent ink in accordance with embodiments of the present invention.

The continuous tones are achieved by a number of durable transparent components, such as inks or liquid toners. The components must be transparent, i.e. they may not scatter the incoming light, but should absorb or reflect a certain amount of the light (FIG. 9). The components should be durable (heat and light resistant) and should preferably be colour neutral over a broad wavelength range, for instance from 400 nm to 950 nm, or above 400 nm or below 950 nm or in ranges such as from 400 nm-700 nm or 700-950 nm.

In the coloured components, such as inks or toners, the pigment particles are preferably highly light resistant e.g. carbon black particles. With a suitable binder these components, such as inks or toners, can resist temperatures above 200° C. and also UV light. In order to optimize the colour neutral behaviour a further pigment may be added e.g. blue pigments such as copper ferrocyanide. This blue pigment is very stable and does not compromise the lifetime of the black component.

These demands can restrict the number of dyes and pigments that can be used.

Preferred pigments are aluminium oxide and carbon. It may be necessary to add other pigments to render the color of the ink colour neutral as is the case with India ink (combination of lampblack and blue pigment). The components, e.g. inks or toners, should preferably be thermal, rather than UV curing in view of the lifetime demands. Each component can be characterized by its optical density OD or absorbance.

The clear ink or toner does not give rise to haze (or scatter) effects and preferably contains pigment nanoparticles.

Both the coloured and colourless components may contain special additives as for instance torpedo molecules to reduce the 'coffee ring effect' which occurs when a droplet of dyed liquid dries. Another additive may be used to control e.g. increase or decrease the 'open time' of the component. The open time is preferably at least 1 s, particularly preferably at least 10 s and especially preferably at least 100 s. While in conventional inks or toners the open time is reduced to a minimum to prevent intermixing of the ink, here an ink or toner can be advantageously in embodiments of the present invention that have a long open time i.e. to encourage intermixing, so-called bleeding. Bleeding is the effect that an ink or toner droplet fades out towards the edges. An intensity profile of a black pixel on a white paper with bleeding has an S-shaped transition from high reflectivity towards very low reflectivity and vice verse. In the printing industry bleeding is regarded as disadvantageous, whereas in the present invention it is useful to provide an optical filter with continuous tones (i.e. with analogue or true grey scales) which can be used in a projector system without the poor image ANSI contrast and with improved image sharpness over the use of a filter produced by digital printing.

Paints and ink-jet inks with good adhesion to glass have been commercialised by Ormo print GmbH both on the basis of dyes and pigments.

The invention claimed is:

1. A projection system comprising: at least two projectors, the first projector being adapted to project a first image, the second projector being adapted to projector a second image, and an optical mask characterized by the optical mask being a continuous tone blend filter formed by printing using a liquid ink or toner onto a transparent substrate, continuous tone variation being provided by bleeding.

2. The projection system of claim 1, wherein the continuous tone blend filter is not composed of individual dots.

3. The projection system of claim 1, wherein the continuous tone blend filter comprises the transparent substrate and a filter layer, the filter layer comprising at least one coloured component and at least one colourless component optionally in a transparent thermally hardened matrix.

4. The projection system of claim 3, wherein the at least one coloured component and the at least one colourless component form the filter layer by mixing/merging on the substrate before thermal hardening or
   wherein the at least one coloured component and the at least one colourless component comprise a first component having particles that have a neutral colour over the wavelength range of 400 nm to 700 nm, or 400 to 950 nm or 700 to 950 nm and a second component that is colourless.

5. The projection system of claim 1, wherein the continuous tone blend filter formed by printing using a plurality of liquid inks or toners with differing grey scales or optical densities when printed or
   wherein the continuous tone blend filter is located to control optically in an overlap zone of two adjacent projected images or
   wherein the continuous tone blend filter has constant thickness across its surface area.

6. A method of projecting multiple images using at least two projectors that project at least a first and a second image respectively, the method comprising:

projecting the at least first and second images with an overlap, and filtering the at least first and second images at the overlap with a continuous tone blend filter formed by printing onto a transparent substrate with liquid inks or toners, continuous tone variation being provided by bleeding.

7. The method of claim 6, wherein the continuous tone blend filter is not composed of individual dots.

8. The method of claim 6, wherein the continuous tone blend filter comprises the transparent substrate and a filter layer, the filter layer comprising at least one coloured component and at least one colourless component optionally in a transparent thermally hardened matrix.

9. The method of claim 6, wherein the at least one coloured component and the at least one colourless component form the filter layer by mixing/merging on the substrate before thermal hardening or wherein the at least one coloured component and the at least one colourless component comprise a first component having particles that have a neutral colour over the wavelength range of 400 nm to 700 nm, or 400 to 950 nm or 700 to 950 nm and a second component that is colourless.

10. The method of claim 6, wherein the continuous tone blend filter formed by printing using a plurality of liquid inks or toners with differing grey scales or optical densities when printed or wherein the continuous tone blend filter is located to control optically in an overlap zone of two adjacent projected images or wherein the continuous tone blend filter has constant thickness across its surface area.

11. A printing process for producing a continuous tone blend filter with a constant thickness for use in a projection system, comprising the steps of additively depositing at least one coloured component and at least one colourless component at least contiguous to one another to provide a constant layer thickness with a continuous tone varying from zero to an optical density of at least 1.5 on a transparent support; and curing said deposited components thereby providing a continuous tone filter, continuous tone variation being provided by bleeding.

12. The printing process of claim 11, wherein the continuous tone blend filter is not composed of individual dots.

13. The printing process according to claim 11, wherein said curing of said deposited components is thermal curing.

14. The printing process according to claim 11, wherein said coloured and colourless components are deposited such that they at least partially overlap with one another.

15. The printing process according to claim 11, wherein the continuous tone varies from zero to an optical density of at least 3.0.

16. The printing process according to claim 11, wherein said printing process is selected from the group consisting of electrostatographic printing, liquid ink printing, and ink-jet printing.

17. The printing process according to claim 11, wherein said printing process is ink-jet printing and said at least one coloured component and said at least one colourless component are ink-jet droplets.

18. The printing process according to claim 17, wherein said coloured and colourless ink-jet droplets are deposited simultaneously or substantially simultaneously, or wherein said coloured and colourless ink-jet droplets have an open time of at least 10 s.

19. The printing process claim 11 wherein said curing said deposited components thereby providing a continuous tone filter includes disabling or reducing a drying process.

20. The printing process of claim 19 further comprising increasing the humidity or water pressure vapour in the air, or cooling before printing.

21. The printing process of claim 11 further comprising raster image processing wherein neighbouring pixels are printed a time differences which do not allow drying of the deposited components.

22. A continuous tone blend filter for use as an optical mask in a multichannel projector system, wherein the continuous tone blend filter is formed by printing onto a transparent substrate with liquid toners or inks, continuous tone variation being provided by bleeding.

* * * * *